(12) United States Patent
Hawkins (10) Patent No.: US 6,202,678 B1
(45) Date of Patent: Mar. 20, 2001

(54) GAS DISCRIMINATING VALVE FOR SHUTTING OFF EXCESSIVE FLOW OF LIQUIDS

(75) Inventor: Stanley E. Hawkins, Visalia, CA (US)

(73) Assignee: Agricultural Products, Inc., Ontario, CA (US)

( * ) Notice: Subject to any disclaimer, the term of this patent is extended or adjusted under 35 U.S.C. 154(b) by 0 days.

(21) Appl. No.: 09/305,233

(22) Filed: May 4, 1999

(51) Int. Cl.[7] .................................................. F16K 17/28
(52) U.S. Cl. ........................ 137/460; 137/497; 137/519.5; 137/533.13
(58) Field of Search ................................... 137/460, 497, 137/519.5, 533.13

(56) References Cited

U.S. PATENT DOCUMENTS

| | | | |
|---|---|---|---|
| 2,278,715 | * 4/1942 | Stoyke | 137/533.13 |
| 3,247,862 | * 4/1966 | Burke | 137/533.13 |
| 3,715,078 | 2/1973 | Reynolds . | |
| 4,010,770 | 3/1977 | Peters . | |
| 4,071,038 | 1/1978 | Robinson . | |
| 4,131,235 | 12/1978 | Lieding . | |
| 4,269,215 | 5/1981 | Odar . | |
| 4,319,604 | 3/1982 | Bird . | |
| 4,364,825 | 12/1982 | Connor, Jr. . | |
| 4,373,548 | * 2/1983 | Chou | 137/460 |
| 4,762,140 | 8/1988 | Davis . | |
| 4,825,897 | * 5/1989 | Shade | 137/519.5 |
| 4,830,046 | 5/1989 | Holt . | |
| 5,178,184 | * 1/1993 | Skillman | 137/533.13 |
| 5,215,113 | 6/1993 | Terry . | |
| 5,265,641 | 11/1993 | Anderson et al. . | |
| 5,372,306 | 12/1994 | Yianilos . | |
| 5,465,752 | 11/1995 | Higgins . | |
| 5,722,454 | 3/1998 | Smith et al. . | |

* cited by examiner

Primary Examiner—Michael Buiz
Assistant Examiner—Ramesh Krishnamurthy
(74) Attorney, Agent, or Firm—Daniel L. Dawes; Myers, Dawes & Andras LLP (57) ABSTRACT

The present invention is a valve that shuts off only upon excess flow of liquid. A ball is seated within a ball holder. The ball holder has a circumferential side wall. An inlet orifice and one or more circumferential apertures are defined in the circumferential side wall. An outlet orifice is defined in a surface disposed above the ball holder. The ball holder may be disposed within a main body which directs all material flowing in the valve to enter the ball holder. Excess flow of liquid effects a shut-off position of the valve when the excess flow of liquid encounters resistance caused by the circumferential apertures. The resistance causes the liquid to flow through the inlet orifice at a flow high enough to push the ball upwards to a height at which the flow of liquid through the circumferential apertures carries the ball further upward to effectively seal the outlet aperture, at which point the sealed position is maintained by hydrostatic pressure. The invention is also a method of shutting off a valve only upon the occurrence of excess flow of liquid. The method involves the interaction of air and liquid with a ball causing the ball to be disposed in either a first open configuration or a second closed configuration.

21 Claims, 5 Drawing Sheets

GAS DISCRIMINATING VALVE FOR SHUTTING OFF EXCESSIVE FLOW OF LIQUIDS

BACKGROUND OF THE INVENTION

1. Field of the Invention

The invention relates to the field of shut-off valves for use in connection with sprinkler irrigation systems.

2. Description of Prior Art

Sprinklers for irrigating recreational playing fields, golf courses, lawns and landscapes are often damaged by animals, accidents, mowers, vehicles, and vandalism. When a sprinkler irrigation system is turned on after such an accident, a considerable stream of water is lost where the sprinkler head or riser was damaged or severed. Since the water is no longer directed to the intended area by the sprinkler nozzles, little to no irrigation benefit is realized in the effected area. The amount of this excess flow can be three or more times the original flow rate through the sprinkler, reducing the overall operating pressure of the zone being irrigated. Therefore, the remaining sprinkler nozzles in the zone are not working with the designed uniformity or efficiency, resulting in uneven and inadequate irrigation. Until the system problem is noticed and repaired, water distributed at the damaged site usually runs off the intended area resulting in great wastage.

Since a great deal of sprinkler irrigation systems are operated automatically by an electric controller, any distribution problem will not likely be observed immediately. Consequently, the irrigation system will most likely continue operating for a number of cycles until physical evidence of a system problem begins to appear, such as the yellowing or wilting of lawns or landscapes.

The prior art solution is to provide a high volume shutoff valve in the irrigation system which will automatically shut down the line experiencing a high flow rate. The prior art discloses various structures for shutting off a valve when the valve encounters unusually high flow. High flow, however, exists not only in the instance of a damaged sprinkler head or severed riser, but also when a irrigation zone with empty lines is first started. This happens often when irrigation zones are free to drain to the lowest point between cycles, causing air to replace the draining water in the lines. Upon start up, pressured water pushes the air in front of it causing the air to both move rapidly at a high flow rate. Since air passes through the nozzles of sprinklers much more freely than liquid, the water advancing behind the air moves through the piping systems at velocities much higher than normal flow rates. Under the prior art, such high pressure of either the air or water, or both, resulting from the start-up of empty lines can trigger the high flow valve to shut off. Obviously, this circumstance is not what shut-off valves were designed for.

Therefore, what is needed is a valve which will shut off only in the case of high flow of water resulting from circumstances such as a damaged or removed sprinkler head or riser, but not when the irrigation system is first being started from empty lines. In other words, what is needed is an irrigation shut-off valve which will not give false shut-offs.

BRIEF SUMMARY OF THE INVENTION

The invention is a valve that shuts off only upon the occurrence of excess flow of liquid or water. More specifically, the valve will maintain an open position during: 1) normal flow of liquid material; 2) high flow of materials in a gaseous state; and 3) high flow of materials in a mixed state of gas and liquid, which is common upon start-up of an irrigation system, for instance. The invention is also a method for shutting off flow of liquid through a conduit only upon the occurrence of excess flow of liquid materials.

In the simplest form, the apparatus is a valve comprising a ball and a ball holder. The ball holder has a circumferential side wall and a floor. An inlet orifice is defined in the floor and at least one or more circumferential apertures are defined in the circumferential side wall. A surface external to the valve is disposed above the ball holder. An outlet orifice is defined in the surface. The outlet orifice has a diameter less than the diameter of the ball so that disposition of the ball into the outlet orifice seals the orifice.

Materials passing through the valve in gaseous state, liquid state, or a mixed state of both liquid and gas, must pass through the ball holder. The present invention in the simplest form does not include a main body, since an external conduit, in which the ball holder is disposed, may serve to restrict all of the materials traveling through the valve to enter the ball holder. Likewise, an outlet orifice must be provided on a surface disposed above the ball and ball holder so that the ball can seal the outlet orifice upon excess flow of liquid. This surface with an outlet orifice defined therein may also be external to the valve. In fact, this surface may be attached to or integral with the conduit in which the ball holder is disposed. Therefore, the invention in its simplest form, does not necessarily include a main body or a seal as part of the ball holder. On the other hand, the preferred embodiment comprises a ball, ball holder, a seal on top of the ball holder with an outlet orifice defined in the seal, and a main body which restricts all materials passing through the valve to flow through the ball holder.

The valve effects a shut-off position only upon excess flow of liquid. When liquid enters the valve through either an external conduit or a main body, the liquid must also enter the ball holder. The liquid enters the ball holder through the circumferential apertures in the circumferential side wall and the inlet orifice in the floor. As liquid enters through the circumferential apertures, the circumferential apertures exert resistance on the liquid causing the liquid to enter through the inlet orifice. The higher the flow of liquid through the circumferential apertures, the greater the resistance which leads to higher flow of liquid through the inlet orifice. The area of the circumferential apertures and the inlet orifice, the diameter, weight and volume of the ball, and the height of the ball holder are all designed in proportion to each other such that a predetermined flow of liquid through the inlet orifice will lift the ball to a predetermined height, this height being the point at which the flow of liquid through the circumferential apertures will carry the ball upwards to seal the outlet orifice.

Therefore, in summary it can be appreciated that the invention is a valve that will shut off only upon excess flow of liquid.

The invention can also be characterized as a method for shutting off excess flow of materials in a liquid state through a conduit comprising the steps of providing a valve with a bottom port, a ball, and a surface with an outlet orifice defined in the surface; disposing the surface with the outlet orifice above the ball; seating the ball inside the valve; passing the materials through the bottom port of the valve; flowing the materials in a gaseous or liquid state or a mixed state of gas and liquid to interact with the ball wherein the interaction between the ball and the materials maintains a first position of the ball; flowing the materials in a liquid state above a predetermined flow rate to interact with the ball wherein the interaction between the ball and the liquid materials displaces the ball to a second position whereby the ball seals the outlet orifice.

The invention now having been briefly summarized, it may be better visualized by turning to the following drawings wherein like elements are referenced by like numerals.

The invention and its various embodiments can now be better understood by turning to the following detailed description wherein an illustrated preferred embodiments is described. It is to be expressly understood that the illustrated embodiment is set forth as an example and not by way of a limitation to the invention as defined in the following claims.

DETAILED DESCRIPTION OF THE PREFERRED EMBODIMENTS

The present invention is a valve that shuts off only upon excess flow of liquid or water. A ball is seated within a ball holder. The ball holder has a floor and a circumferential side wall. An inlet orifice is defined in the floor and one or more circumferential apertures are defined in the circumferential side wall. An outlet orifice is defined in a surface disposed above the ball holder. The ball holder may be disposed within a main body which directs all material flowing in the valve to enter the ball holder. Excess flow of liquid effects a shut-off position of the valve when the excess flow of liquid encounters resistance caused by the circumferential apertures. The resistance causes the liquid to flow through the inlet orifice at a flow rate which is high enough to push the ball upwards to a height at which the flow of liquid through the circumferential apertures carries the ball further upward to effectively seal the outlet aperture, at which point the sealed position is maintained by hydrostatic pressure.

The invention is also a method of shutting off a valve only upon the occurrence of excess flow of liquid. The method involves the interaction of air and liquid with a ball causing the ball to be disposed in either a first open configuration or a second closed configuration.

It should be understood that though the illustrated preferred embodiment of the present invention is a valve for use in connection with irrigation systems, but that the invention may be applied in a variety of other fields. This invention is particularly applicable where excess flow of only liquid material through a conduit is sought to be shut off.

Figure 1:
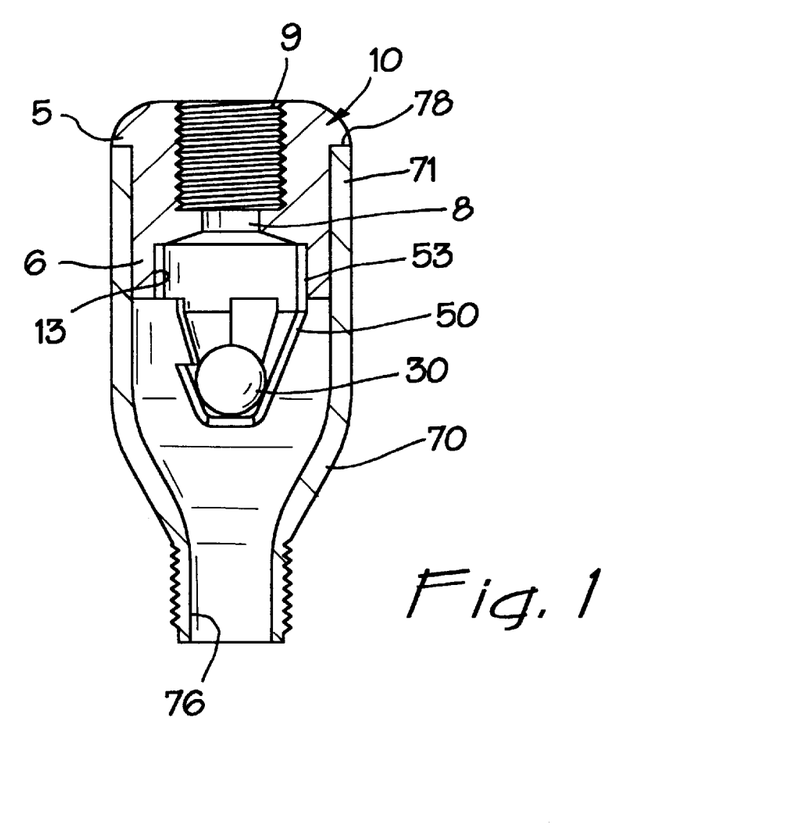
FIG. 1 is a cross-sectional side view of the shut-off valve.

FIG. 1 is a cross-sectional side view of the preferred embodiment of the present invention. The preferred embodiment of the invention, generally denoted by reference numeral 90, includes an outlet member generally denoted by reference numeral 10, a ball generally denoted by reference numeral 30, a ball holder generally denoted by reference numeral 50, and an inlet main body generally denoted by reference numeral 70. As shown in FIG. 1, an annulus 40 is defined between the ball holder 50 and the main body 70.

Figure 2:
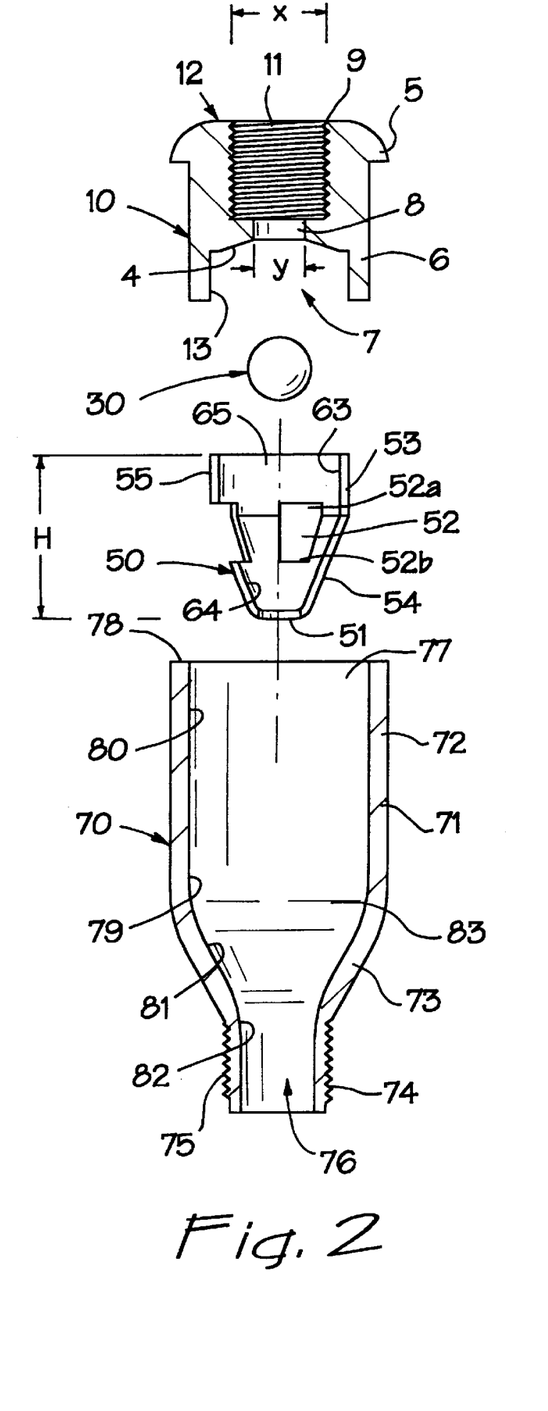
FIG. 2 is an exploded, cross-sectional side view of the threaded outlet, ball, ball holder, and main body.

FIG. 2 is an exploded cross-sectional side-view of the present invention. Ball holder 50 has a circumferential side wall 55. Circumferential side wall 55 has an upper portion 53 and a lower portion 54. The length and relative proportions of each may vary according to the teachings of the invention. In the preferred embodiment, the lower portion 54 tapers in towards the longitudinal axis 66 as it extends downwards along the longitudinal axis 66 from the upper portion 53 towards the lower portion 54. The overall shape is a combination of a cylinder and an inverted frustoconical shape. Ball holder 50 has at least one or more circumferential apertures 52 defined in circumferential side wall 55. As shown in the bottom plan view of FIG. 3A, lower portion 54 of ball holder 50 defines an inlet aperture 51. Spherical ball 30 of predetermined weight and diameter sits inside ball holder 50.

FIG. 2 also shows an outlet member 10. Outlet member 10 has a longitudinal bore 11 opening from a top surface 12 of outlet member 10 and communicating to a bottom cavity 7. In the preferred embodiment of the invention, longitudinal bore 11 has an internally threaded upper portion 9 with a wider diameter X than outlet orifice 8 which has a diameter Y. The bottom cavity 7 is defined by a lip 6 of outlet member 10.

Main body 70 has an annular side wall 71. Annular side wall 71 has an upper portion 72, a shoulder portion 73, and an externally threaded bottom portion 75. In the preferred embodiment of the present invention as seen in FIG. 2, shoulder portion 73 tapers towards longitudinal axis 66 as it extends from upper portion 72 to bottom portion 75. With internally threaded portion 9 of the outlet member 10 and externally threaded outer portion 75 of main body 70, it can be appreciated that valve 90 can be joined between two pipes designed to be threadably connected.

FIG. 1 shows valve 90 fully assembled. As shown in FIG. 1, ball 30 sits inside ball holder 50. Ball holder 50 is press fit or otherwise fixed into the outlet member 10 such that upper side wall 53 of ball holder 50 fits against an inner surface 13 of lip 6 of outlet member 10. Ball holder 50 plus outlet member 10 assembly is then inserted into top opening 77 (shown in FIG. 2) of main body 70. A protruding shoulder 5 of outlet member 10 rests on top surface 78 of side wall 71 of main body 70. Many alterations and modifications in assembly may be made by those having ordinary skill in the art without departing from the spirit and scope of the invention.

In the preferred embodiment, the diameter of the ball is in the range of 0.5 inch to 0.75 inch thus leading to a volume in the range of 0.065 cu.in. to 0.22 cu.in. The weight of the ball is in the range of 0.294 oz to 0.996 oz. The area of the inlet orifice 51 of the ball holder 50 is in the range of 0.31 inch to 0.40 inch. The longest dimension of the outlet orifice 8 must be less than the diameter of ball 30 such that ball 30 can effectively seal outlet orifice 8. The height H of the ball holder 50 is in the range of 1.24 inch to 1.5 inch. Circumferential apertures 52 are rectangular in shape and have a height parallel to axis 66 of 0.46 inch and a width of 0.324 inch perpendicular to axis 66. When ball 30 is in a resting position as shown in FIG. 1, the bottom edges of circumferential apertures 52 are disposed above the center of ball 30 such that the lower portion 54 of ball holder 50 beneath the circumferential apertures 52 shields over half the height of ball 30.

Figure 3:
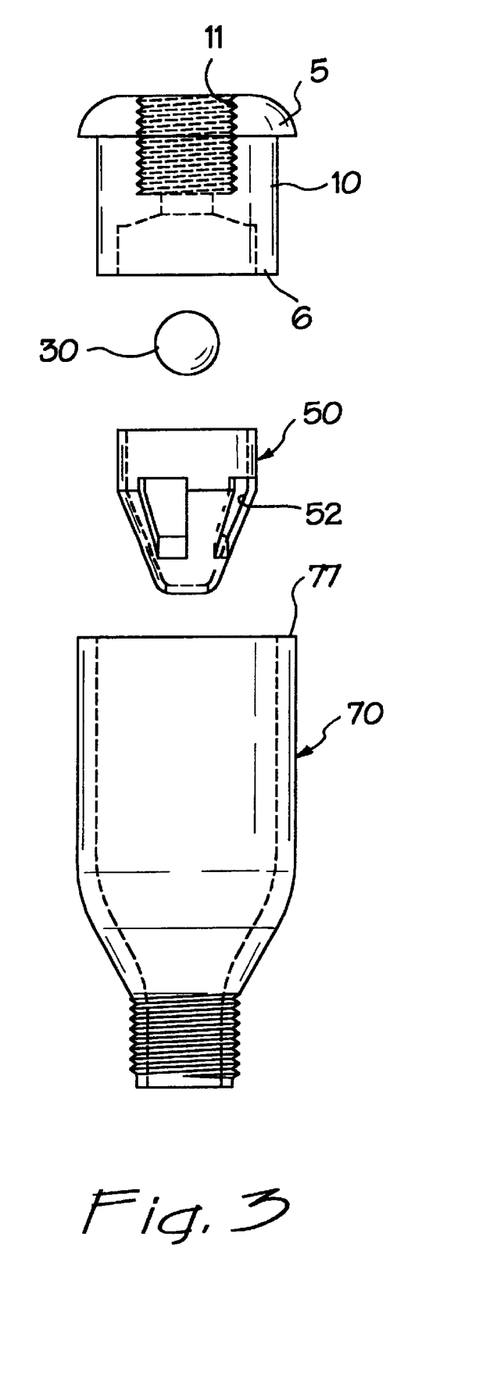
FIG. 3 is an exploded, elevational side view of the threaded outlet, ball, ball holder, and main body with hidden view shown in dashed lines.
Figure 3A:
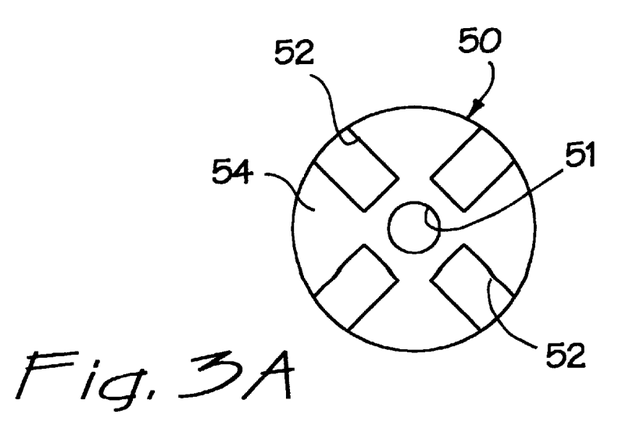
FIG. 3a is a bottom elevational end view of the ball holder.

It can be appreciated that though the design specifications of the preferred embodiment lie in the above-mentioned ranges, countless alterations and modifications may be made by those having ordinary skill in the art without departing from the spirit and scope of the invention. As will be described in the operation below, what is more important than the numerical design specification of each part of the structure is the proportion of each element relative to all the other elements. For instance, a ball 30 with a smaller diameter will require the outlet orifice 8 of the outlet member 10 to have a smaller diameter, or cross dimension, so that ball 30 will entirely block the outlet orifice 8 of the outlet member 10. As an additional example, assuming the weight and diameter of ball 30 is constant and the height H of the ball holder 50 is constant, changing the size of the inlet orifice 51 will require the size of the circumferential apertures 52 to change. Each of the shapes, dimension and in case of ball 30, the weight, of the elements pictured in FIGS. 1–3 are related so that changing one may require changing another in order to maintain the overall performance of valve 90 invariant.

Figure 4:
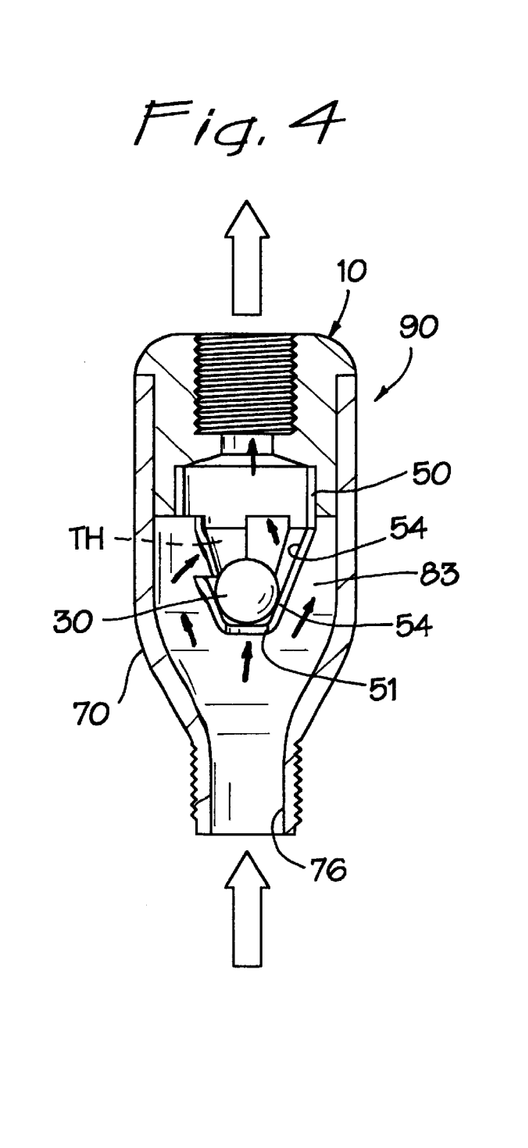
FIG. 4 is a cross-sectional side view of the shut-off valve in operation under conditions of normal flow of liquid, as well as start-up flow, which includes flow of materials in a gaseous state, liquid state, or a mixed state of gas and liquid.
Figures 5, 6:
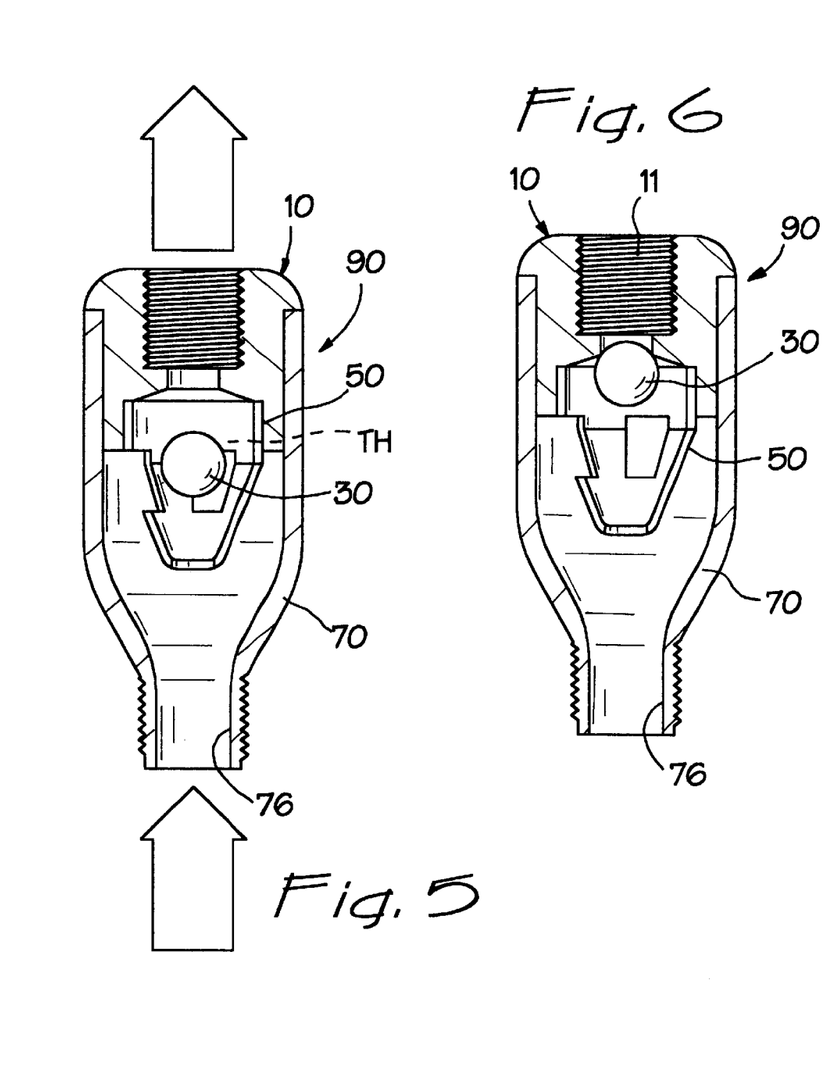
FIG. 5 is a cross-sectional side view of the shut-off valve in operation under excessive flow of liquid only before shut off has occurred.
FIG. 6 is a cross-sectional side view of the shut-off valve in the shut-off position resulting from excessive flow of liquid only.

The structure of valve 90 now having been described, turn now to its operation by referring to FIGS. 4–6. The operation of the invention can be best understood in three different scenarios: #1—normal flow of materials in liquid state; #2—start-up flow including materials in a gaseous state, liquid state, or a mixed state of gas and liquid; and #3—excess flow of materials in liquid state.

FIG. 4 shows the condition of the invention 90 under Scenarios #1 and #2. Assuming normal flow of liquid under Scenario #1, the liquid (depicted by the arrows) enters valve 90 through bottom port 76 of main body 70. As the liquid travels upwardly to inner shoulder section 83, it will travel in two different directions: 1) straight up and through the inlet orifice 51 of ball holder 50; creating an inlet orifice flow; and 2) around floor 56 and lower side wall 54 of ball holder 50 and vertically up through the circumferential aperture or apertures 54, creating a circumferential aperture flow. In the preferred embodiment of the present invention as shown in FIG. 4, the shape of circumferential aperture 52 coupled with the frustoconical shape of ball holder 50 allows liquid entering circumferential apertures 52 to travel upwards in a vertical streamlined flow.

Circumferential apertures 52 and annulus 40 exert resistance on the liquid causing the liquid to enter through inlet orifice 51, creating the inlet orifice flow. Thus, the inlet orifice flow is determined by: 1) the resistance caused by circumferential apertures 52; and 2) the diameter of the inlet orifice 51. Under normal flow, the weight and size of ball 30 is such that ball 30 will not be lifted up to a predetermined height, namely the threshold height TH, wherein the circumferential aperture flow will carry ball 30 further upwards. Consequently, liquid entering inlet orifice 51 may lift ball 30 slightly upwards, but will then travel around ball 30 and continue upwards. Therefore, under normal flow, liquid will enter through both the circumferential apertures 54 and the inlet orifice 51 as the ball 30 remains below a threshold height TH.

In a start-up condition, gaseous material, such as air, will travel rapidly up the valve as it is being pushed and followed by the rapidly advancing liquid. Gaseous material traveling up valve 90 will behave in the same manner as liquid, except that the much lighter density of the gaseous material will not cause ball 30 to significantly lift. The resistance to the gaseous material caused by circumferential apertures 52 and annulus 40 is less than the resistance caused by the weight of ball 30 sitting over inlet orifice 51. Therefore, the gaseous material will travel mostly through circumferential apertures 52 as it exits valve 90, and in any case will never be able to lift and maintain ball 30 above threshold height TH.

As for liquid rapidly advancing behind the gaseous material in a start-up condition, the liquid will enter bottom port 76 at a high flow rate. However, circumferential apertures 52 will not exert any significant resistance on that initial liquid, since only gaseous material remains in front of the initial liquid. Thus, the liquid will travel around floor 56 and bottom side wall 54 of the ball holder 50 and enter through the circumferential apertures 54. The fast moving liquid quickly fills the riser and sprinkler, instantly lowering the flow rate when the liquid reaches the sprinkler nozzle. Even if an upshot of rapidly moving initial liquid were to shoot through inlet orifice 51 causing the ball 30 to jump, the lack of sustained high velocity, circumferential aperture flow will fail to carry the ball 30 to outlet orifice 8 and maintain it there which is necessary for shut-off.

FIG. 5 shows a snapshot of an upwards moving ball 30 in valve 90 under Scenario #3, a condition of excessive liquid flow which may result from a damaged sprinkler head or severed riser. In other words, FIG. 5 displays the valve in the process of, and just prior to, shut-off.

Under excess flow of liquid due to a damaged sprinkler head or severed riser, the resistance caused by circumferential apertures 52 and annulus 40 increases the flow through inlet orifice 51. The flow through the inlet orifice 51 is increased to a threshold amount such that the ball 30 is pushed upwards to threshold height TH. Once the ball 30 reaches the threshold height TH, the flow from circumferential apertures 52 will continue to carry ball 30 upwards.

FIG. 6 shows valve 90 in the shut-off position under Scenario #3. Ball 30 being carried by the flow of liquid through circumferential apertures 52 closes outlet orifice 8 of outlet member 10. In this shut-off position, liquid is prevented from leaving outlet orifice 8. Once shut off, the closed position will remain stable as long as liquid is being pumped through the irrigation system, since the hydrostatic pressure of liquid underneath the ball 30 is greater than back pressure in outlet port 11, thus causing ball 30 to cover outlet orifice 8. With the shut-off position remaining constant, any hammering or chattering effect is avoided.

Figure 7:
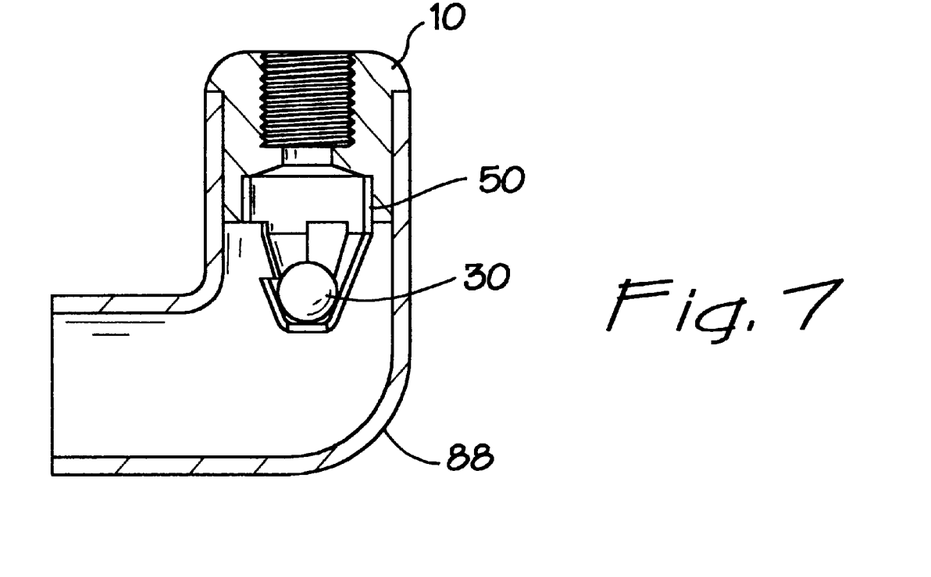
FIG. 7 is cross-sectional side view of an alternative embodiment of the present invention.
Figure 8:
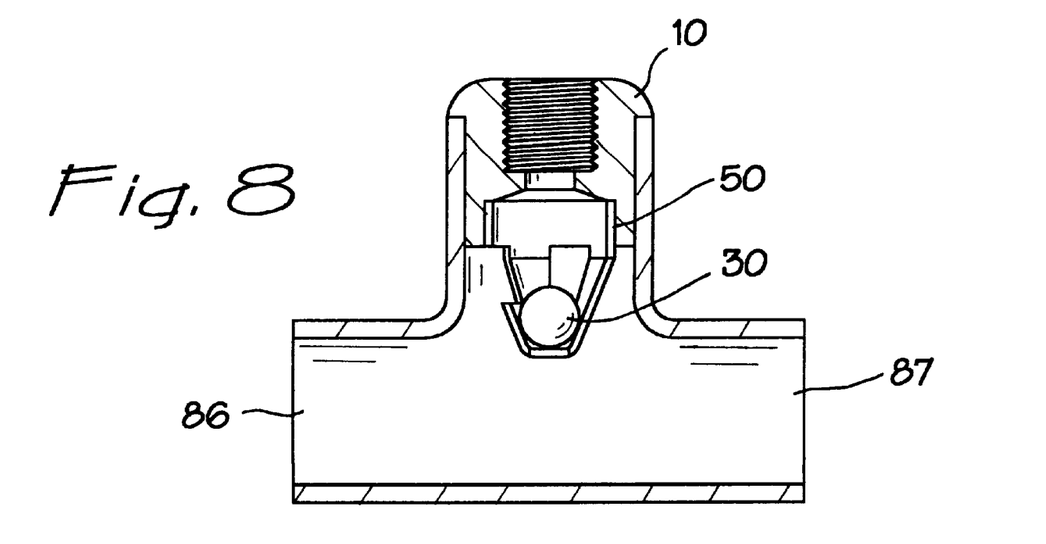
FIG. 8 is cross-sectional side view of another embodiment of the present invention.

FIG. 7 shows an alternate embodiment of the invention in which main body 70 is a curved, elbow configuration containing a bend 88. FIG. 8 shows another embodiment in which the main body 70 is an upside-down T configuration having two inlet ports 86, 87, opposite each other. Obviously, the alternate embodiments of the invention may also comprise a main body with more than two ports.

Figure 9:
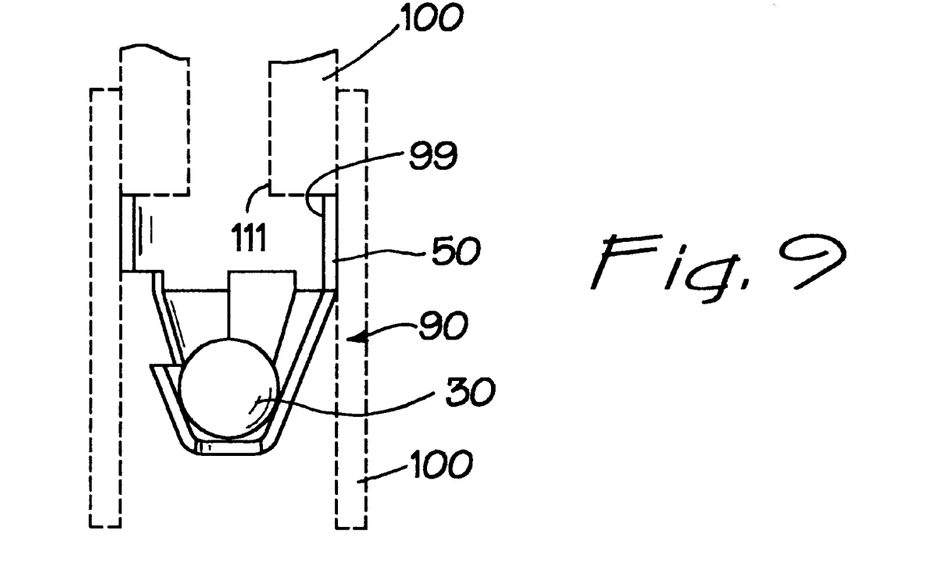
FIG. 9 is a cross-sectional side view of an alternative embodiment comprising just the ball and the ball holder.

FIG. 9 shows an alternate embodiment of the invention in a simpler form as including only a ball 30 and ball holder 50.

FIG. 9 shows ball holder 50 with an open top 99 such that an outlet orifice (not shown) would have to be provided externally. An external outlet orifice 111 may be provided by the same conduit 100 in which ball holder 50 is disposed as shown in dotted outline. Since FIG. 9 does not contain the element of a main body, in order for this valve to operate, the conduit in which this valve is disposed must direct all flow of material through valve 90.

Figure 10:
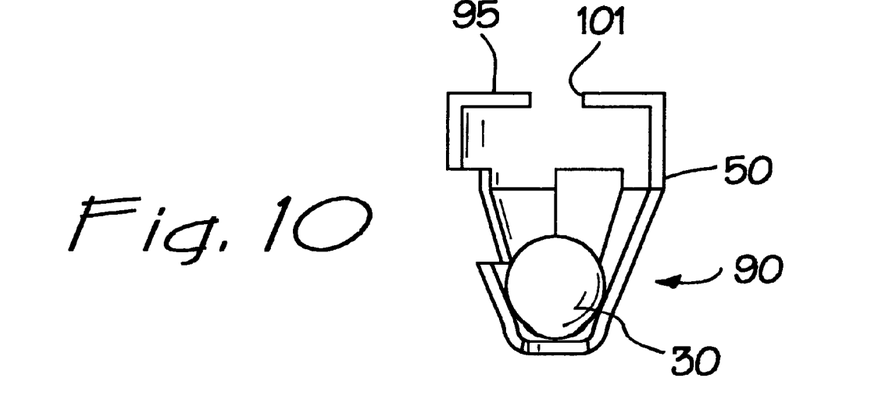
FIG. 10 is a cross-sectional side view of an alternative embodiment comprising the ball and the ball holder with a lid.

FIG. 10 shows an alternate embodiment of the invention in another simplified form as including only a ball 30 and ball holder 50. Ball holder 50 has a lid 95 in which an outlet orifice 101 is defined. Thus, this embodiment of valve 90 may be simply disposed or slip fit into the end of a conduit or pipe as long as the conduit restrains all of the flow of the traveling material, be it gas or liquid, through valve 90.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

Thus, the present invention may be used in a variety of applications in addition to sprinkler shut-off valves. Some examples include water fountains, spray guns and hoses that disperse various liquids such as paint, and more. The invention may be used in any mechanism where excess flow of liquid, and not gas, is sought to be restrained.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention. Where an element is referred to in the singular form, the claims are to be understood as including the plural form. Where an element is referred to in the plural form, the claims are to be understood as including the singular form.

Furthermore, the claims are to be understood as comprising embodiments beyond what is described in this specification. This applies particularly to the method claims wherein countless varieties of structural elements may read upon those claims.

I claim:

1. A valve having an outlet orifice used in connection with at least one conduit, the conduit carrying at any one time a liquid, a gas or a mixture of gas and liquid, wherein the conduit confines all of the liquid and gas to flow into the valve, wherein the valve shuts off in the instance of excessive flow of the liquid only, wherein the valve maintains an open position in the instance of flow of the gas or the mixture of gas and liquid, wherein the valve maintains an open position in the instance of normal flow of the liquid, the valve comprising:

a ball;

a ball holder; and a main body having a circumferential side wall and at least one inlet port;

wherein the body holder is disposed within the main body such that an annulus is defined as a fully circumferential space between the circumferential side wall of the main body and the ball holder, wherein the ball sits inside the ball holder as a result of gravity absent any flow of material, the ball having a diameter and weight;

wherein the ball holder has a lower portion with an inlet orifice being defined in the lower portion with a diameter smaller than the ball to provide metering of fluid flow therethrough impinging on the ball and a circumferential side wall with at least one or more circumferential apertures being defined in the circumferential side wall and partially shielding the ball to meter flow of fluid through the circumferential side wall impinging on the ball, the inlet orifice having an area, the circumferential apertures each having an area, the ball holder having a height; and wherein the diameter and weight of the ball, the area of the inlet orifice, the areas of the circumferential apertures, and the height of the ball holder are all defined within a range in proportion to one another such that excessive flow of liquid beyond a predetermined magnitude selectively effects a shut-off position, whereby the liquid, gas or a mixture thereof entering the valve enter the ball holder through the inlet orifice and through the circumferential apertures, the liquid, gas or a mixture thereof having an inlet orifice flow and a circumferential aperture flow, wherein once the liquid enters through the circumferential apertures, the circumferential apertures create a resistance on the liquid, the resistance causing the liquid to enter through the inlet orifice, the resistance increasing with increased flow of the liquid through the circumferential aperture, whereby once the circumferential aperture flow of the liquid exceeds a predetermined level, the resistance caused by the circumferential apertures will force the liquid to flow through the inlet orifice at a rate high enough to lift the ball upwards to a height at which the circumferential aperture flow of the liquid carries the ball to the outlet orifice of the valve, whereby the circumferential aperture flow of the liquid will cause the ball to close the outlet orifice to prevent further exit of the liquid from the valve.

2. The valve of claim 1 further comprising a lid being disposed on top of the ball holder with the outlet orifice being defined in the lid.

3. The valve of claim 2 wherein the side wall of the ball holder has an upper portion having a cylindrical shape, a lower portion having an inverted conical shape wherein the diameter of the lower portion decreases down a longitudinal axis until the lower portion meets a floor, wherein the ball holder has an inverted frustoconical shape.

4. The valve of claim 1 wherein the side wall of the ball holder has an upper portion having a cylindrical shape, a lower portion having an inverted conical shape wherein the diameter of the lower portion decreases down a longitudinal axis, wherein the ball holder has an inverted frustoconical shape.

5. The valve of claim 4 further comprising an outlet member with the outlet orifice defined in the outlet member, the outlet orifice having a diameter less than the diameter of the ball, the outlet member being disposed on top of the ball holder.

6. The valve of claim 1 further comprising an outlet member with the outlet orifice defined in the outlet member, the outlet orifice having a diameter less than the diameter of the ball, the outlet member being disposed on top of the ball holder.

7. A valve used for passage of a liquid, gas or a mixture of gas and liquid which valve shuts off during excess flow of liquid only, wherein the valve maintains an open position in the instance of flow of gas or mixture of gas and liquid, wherein the valve maintains an open position in the instance of normal flow of the liquid, the valve comprising:

a ball having a diameter and weight;

a ball holder having a lower portion with an inlet orifice being defined therein and a circumferential side wall with at least one or more circumferential apertures being defined in the circumferential side wall and partially shielding the ball to meter flow of fluid through the circumferential side wall impinging on the ball, the inlet orifice having an area, the circumferential apertures each having an area, the ball holder having a height, wherein the ball sits inside the ball holder as a result of gravity absent any flow of material;

a seal in which an outlet orifice is defined, the outlet orifice having a diameter less than the diameter of the ball, the seal being disposed on top of the ball holder; and a main body having a circumferential side wall and at least one inlet port, wherein an annulus is defined as a fully circumferential space between the circumferential side wall of the main body and the ball holder, wherein the ball holder with the ball is disposed within the main body, wherein the diameter and weight of the ball, the area of the inlet orifice being sized be less than the diameter of the ball to therefore act as a metering orifice for flow of fluid impinging on the ball, the areas of the circumferential apertures, and the height of the ball holder are all defined within a range in proportion to one another such that excessive flow of the liquid beyond a predetermined magnitude selectively effects a shut-off position of the ball with respect to the seal, wherein the liquid, gas and mixtures thereof entering the valve first enter the main body through the at least one inlet port, whereby the main body restricts all of the materials traveling through the valve to enter the ball holder, whereby liquid, gas and mixtures thereof enter the ball holder through the inlet orifice and through the circumferential apertures, the liquid, gas and mixtures thereof having an inlet orifice flow and a circumferential aperture flow, wherein once the liquid enters through the circumferential apertures, the circumferential apertures create a resistance on the liquid, the resistance causing the liquid to enter through the inlet orifice, the resistance increasing with increased flow of the liquid through the circumferential aperture, wherein once the circumferential aperture flow of the liquid exceeds a predetermined level, the resistance caused by the circumferential apertures will force the liquid to flow through the inlet orifice at a rate high enough to lift the ball upwards to a height at which the circumferential aperture flow of the liquid carries the ball to the outlet aperture of the conduit, and wherein the circumferential aperture flow of the liquid will cause the ball to close the outlet orifice to prevent further exit of the liquid from the valve.

8. The valve of claim 7 wherein the seal comprises an outlet member having a cap in which a bore and a bottom cavity is defined, the bore communicating from a top surface of the outlet member to the bottom cavity, and wherein the outlet orifice is the bore defined through the outlet member.

9. The valve of claim 8 wherein the side wall of the ball holder has an upper portion having a cylindrical shape, a lower portion having an inverted conical shape wherein the diameter of the lower portion decreases down a longitudinal axis, wherein the ball holder has an inverted frustoconical shape.

10. The valve of claim 7 wherein the seal comprises a lid attached on top of the ball holder, the outlet orifice being defined in the lid.

11. The valve of claim 10 wherein the side wall of the ball holder has an upper portion having a cylindrical shape, a lower portion having an inverted conical shape wherein the diameter of the lower portion decreases down a longitudinal axis, wherein the ball holder has an inverted frustoconical shape.

12. The valve of claim 7 wherein the side wall of the ball holder has an upper portion having a cylindrical shape, a lower portion having an inverted conical shape wherein the diameter of the lower portion decreases down a longitudinal axis, wherein the ball holder has an inverted frustoconical shape.

13. A valve to be used in connection with an irrigation system to shut off only during excess flow of water through the valve, wherein the valve will maintain an open position in the instance of flow of air or water during start-up of the system, and wherein the valve will maintain an open position in the instance of normal flow of water, the valve comprising:

a ball having a diameter and weight;

a ball holder having a lower portion with an inlet orifice being defined in the lower portion with an area less than a cross-sectional area of the ball to meter flow of fluid through the inlet orifice which impinges on the ball and a circumferential side wall with at least one or more circumferential apertures being defined in the circumferential side wall and partially shielding the ball to meter flow of fluid through the circumferential side wall impinging on the ball, the inlet orifice having an area, the circumferential apertures each having an area, the ball holder having a height, wherein the ball sits inside the ball holder as a result of gravity absent any flow of air or water;

a seal disposed on top of the ball holder with an outlet orifice defined in the seal, the outlet orifice having a diameter less than the diameter of the ball; and a main body having a circumferential side wall and at least one inlet port, wherein the ball holder with the ball is disposed within the main body and an annulus is defined as a fully circumferential space between the circumferential side wall of the main body and the ball holder, wherein the diameter and weight of the ball, the area of the inlet orifice, the areas of the circumferential apertures, and the position of the circumferential apertures in the side wall are all defined within a range in proportion to one another such that excessive flow of water beyond a predetermined magnitude selectively effects a shut-off position, whereby the air or water entering the valve first enters the main body through the at least one inlet port, whereby the main body restricts all of the air or water traveling through the valve to enter the ball holder, whereby the air or water enters the ball holder through the inlet orifice and through the circumferential apertures, the air or water having an inlet orifice flow and a circumferential aperture flow, whereby once water enters through the circumferential apertures, the circumferential apertures create a resistance on the water, the resistance causing the water to enter through the inlet orifice, the resistance increasing with increased flow of the water through the circumferential aperture, whereby once the circumferential aperture flow of the water exceeds a predetermined level, the resistance caused by the circumferential apertures will force the water to flow through the inlet orifice at a rate high enough to lift the ball upwards to a height at which the circumferential aperture flow of the water carries the ball to the outlet orifice of the seal, whereby the circumferential aperture flow of the water will cause the ball to close the outlet orifice to prevent further exit of the water from the valve.

14. The valve of claim 13 wherein the seal comprises an outlet member having a cap in which a bore and a bottom cavity are defined, the bore communicating from a top surface of the outlet member to the bottom cavity, wherein the outlet orifice of the seal is the bore of the outlet member.

15. The valve of claim 14 wherein the side wall of the ball holder has an upper portion having a cylindrical shape a lower portion having an inverted conical shape wherein the diameter of the lower portion decreases down a longitudinal axis, wherein the ball holder has an inverted frustoconical shape.

16. The valve of claim 13 wherein the seal comprises a lid attached on top of the ball holder.

17. The valve of claim 16 wherein the side wall of the ball holder has an upper portion having a cylindrical shape, a lower portion having an inverted conical shape wherein the diameter of the lower portion decreases down a longitudinal axis, wherein the ball holder has an inverted frustoconical shape.

18. The valve of claim 13 wherein the side wall of the ball holder has an upper portion having a cylindrical shape, a lower portion having an inverted conical shape wherein the diameter of the lower portion decreases down a longitudinal axis, wherein the ball holder has an inverted frustoconical shape.

19. The valve of claim 13 wherein the main body further comprises an elbow.

20. The valve of claim 13 wherein the main body further comprises a tee.

21. A method of shutting off excess flow of materials in liquid only state through a conduit comprising:

providing a valve with an inlet port, a ball, and a surface with an outlet orifice defined in the surface;

disposing the surface with the outlet orifice defined therein above the ball as defined by the direction of gravity;

providing a ball holder with an inlet orifice and circumferential apertures;

seating the ball inside the ball holder by action of gravity;

partially shielding the ball to meter flow of fluid through the circumferential apertures which impinges on the ball;

providing a main body;

disposing the ball holder within the main body such that an annulus is formed as a fully circumferential space between the ball holder and the main body;

passing materials in a liquid state, gas state, or in states of liquid and gas, through the inlet port of the valve;

directing all materials in the main body to flow through the ball holder;

flowing the materials through the inlet orifice and circumferential apertures of the ball holder, the inlet orifice having an area which meters flow of fluid impinging on the ball flowing through the inlet orifice;

flowing the materials to contact the ball wherein the contact between the ball and the materials maintains an open configuration of the ball to permit flow of the materials through the valve;

flowing the materials in a liquid only state above a predetermined flow rate to contact the ball, wherein the contact between the ball and the liquid materials displaces the ball to a closed configuration to seal the outlet orifice with the ball.

* * * * *